United States Patent
Lin et al.

(10) Patent No.: US 9,052,539 B2
(45) Date of Patent: Jun. 9, 2015

(54) LIQUID CRYSTAL DISPLAY DEVICE, COMPENSATION CIRCUIT AND TFT VOLTAGE SHUTDOWN METHOD THEREOF

(71) Applicant: Shenzhen China Star Optoelectronics Technology Co., Ltd., Shenzhen, Guangdong (CN)

(72) Inventors: Poshen Lin, Guangdong (CN); Yu Wu, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 200 days.

(21) Appl. No.: 13/824,394

(22) PCT Filed: Feb. 6, 2013

(86) PCT No.: PCT/CN2013/071477
§ 371 (c)(1),
(2) Date: Mar. 18, 2013

(87) PCT Pub. No.: WO2014/121474
PCT Pub. Date: Aug. 14, 2014

(65) Prior Publication Data
US 2014/0333863 A1    Nov. 13, 2014

(30) Foreign Application Priority Data
Feb. 5, 2013   (CN) .......................... 2013 1 0046003

(51) Int. Cl.
*G02F 1/133*   (2006.01)
*G09G 3/36*   (2006.01)

(52) U.S. Cl.
CPC .......... *G02F 1/13306* (2013.01); *G09G 3/3677* (2013.01); *G09G 2330/027* (2013.01)

(58) Field of Classification Search
CPC    G09G 3/3688; G09G 3/3648; G09G 2330/01
USPC .................. 345/87, 204, 211–214; 349/42
See application file for complete search history.

(56) References Cited

U.S. PATENT DOCUMENTS 5,777,515 A * 7/1998 Kimura .......................... 330/257
8,044,900 B2 * 10/2011 Kim et al. ........................ 345/87
(Continued)

FOREIGN PATENT DOCUMENTS

CN   102855862 A   7/2014

*Primary Examiner* — Ricardo L Osorio
(74) *Attorney, Agent, or Firm* — Andrew C. Cheng

(57) ABSTRACT

The present invention provides a liquid crystal display device, compensation circuit and TFT voltage shutdown method. The compensation circuit includes first capacitor, first resistor, second resistor and operational amplifier; wherein first terminal of first capacitor connected to receiving terminal of gate driver of LCD for receiving shutdown voltage to shutdown TFT; first terminal of first resistor connected to second terminal of first capacitor; first terminal of second resistor connected to second terminal of first resistor and second terminal of second resistor connected to output terminal of operational amplifier; positive input terminal of operational amplifier receiving an externally supplied shutdown voltage for gate driver, and negative input terminal of operational amplifier connected to second terminal of first resistor; wherein connection between first capacitor and receiving terminal of gate drive independent from connection between output terminal of operational amplifier and receiving terminal of gate driver.

10 Claims, 2 Drawing Sheets

100

(56) References Cited

U.S. PATENT DOCUMENTS

2007/0002005 A1 1/2007 Kim
2007/0080905 A1* 4/2007 Takahara .................. 345/76
2009/0102779 A1* 4/2009 Jo .................. 345/101
2009/0322234 A1* 12/2009 Chen et al. .................. 315/159
2012/0280965 A1* 11/2012 Lee .................. 345/212
2013/0147375 A1* 6/2013 Williams et al. .............. 315/192

* cited by examiner

LIQUID CRYSTAL DISPLAY DEVICE, COMPENSATION CIRCUIT AND TFT VOLTAGE SHUTDOWN METHOD THEREOF

BACKGROUND OF THE INVENTION

1. Field of the Invention

The present invention relates to the field of liquid crystal display device, compensation and thin film transistor (TFT) voltage shutdown method thereof.

2. The Related Arts

Due to the advantages of low radiation, small size and low power consumption, the liquid crystal display devices have replaced the conventional CRT and find wide applications in the field of displaying for notebook PC, PDA, flat TV and mobile phones.

In known liquid crystal displaying technique, each pixel is turned on and off by the semiconductor integrated behind the panel, in other words, driven by the TFT. Therefore, the liquid crystal display device can display screens after screens of information with high speed, high luminance and high contrast.

SUMMARY OF THE INVENTION

The following description will describe the features and advantages of the present invention.

The present invention provides a compensation circuit for liquid crystal display device, which comprises: a first capacitor, a first resistor, a second resistor and an operational amplifier; wherein the first terminal of the first capacitor being connected to the receiving terminal of the gate driver of the liquid crystal display device for receiving shutdown voltage to shutdown TFT; the first terminal of the first resistor being connected to the second terminal of the first capacitor; the first terminal of the second resistor being connected to the second terminal of the first resistor and the second terminal of the second resistor being connected to the output terminal of the operational amplifier; the positive input terminal of the operational amplifier receiving an externally supplied shutdown voltage for the gate driver, and the negative input terminal of the operational amplifier being connected to the second terminal of the first resistor; wherein the connection between the first capacitor and the receiving terminal of the gate drive being independent from the connection between the output terminal of the operational amplifier and the receiving terminal of the gate driver.

According to a preferred embodiment of the present invention, a voltage outputted from the output terminal of the operational amplifier is supplied to the gate driver of the liquid crystal display device through a chip on film.

According to a preferred embodiment of the present invention, the resistance ratio between the first resistor and the second resistor is determined based on the experiment results.

The present invention provides a liquid crystal display device, which comprises: a display area, comprising a plurality of gate lines; a gate driver, comprising a plurality of stages connected respectively to the plurality of gate lines for supplying TFT shutdown voltage and an input terminal for receiving the shutdown voltage; a compensation circuit, further comprising: a first capacitor, a first resistor, a second resistor and an operational amplifier; wherein the first terminal of the first capacitor being connected to the receiving terminal of the gate driver of the liquid crystal display device for receiving shutdown voltage to shutdown TFT; the first terminal of the first resistor being connected to the second terminal of the first capacitor; the first terminal of the second resistor being connected to the second terminal of the first resistor and the second terminal of the second resistor being connected to the output terminal of the operational amplifier; the positive input terminal of the operational amplifier receiving an externally supplied shutdown voltage for the gate driver, and the negative input terminal of the operational amplifier being connected to the second terminal of the first resistor; wherein the connection between the first capacitor and the receiving terminal of the gate drive being independent from the connection between the output terminal of the operational amplifier and the receiving terminal of the gate driver.

According to a preferred embodiment of the present invention, a voltage outputted from the output terminal of the operational amplifier is supplied to the gate driver of the liquid crystal display device through a chip on film.

According to a preferred embodiment of the present invention, the resistance ratio between the first resistor and the second resistor is determined based on the experiment results.

According to a preferred embodiment of the present invention, the liquid crystal display device further comprises: a data driver, further comprising a plurality of data stages, wherein the display area further comprises a plurality of data lines perpendicular to the plurality of the gate lines, wherein the plurality of the data stages are connected to the plurality of the data lines respectively.

According to a preferred embodiment of the present invention, when the plurality of data stages of the data driver and the plurality of stages of the gate driver are perpendicularly disposed and the first data stage of the plurality of data stages is adjacent to the first stage of the plurality of stage, the first data stage passes through the connection between the first capacitor and the receiving terminal of the gate driver and the connection between the output terminal of the operational amplifier and the receiving terminal of the gate driver.

The present invention provides a thin film transistor (TFT) voltage shutdown method of liquid crystal display device, which comprises the following steps: receiving a first voltage through a first input terminal of an operational amplifier, the first voltage being supplied for a gate driver of the liquid crystal display device; receiving a second voltage through a second input terminal of the operational amplifier, the second voltage being supplied for the gate driver of the liquid crystal display device; and supplying a shutdown voltage to the gate driver through an output terminal of the operational amplifier to shutdown the TFT of the liquid crystal display device.

According to a preferred embodiment of the present invention, through detecting the returning gate signal and a signal inputted to the gate, the returning gate signal and the signal inputted to the gate are reverse to each other; when detecting the coupling resulting in a waveform with oscillation, a reverse waveform in putted to the gate.

According to a preferred embodiment of the present invention, the returning gate signal and the signal inputted to the gate are transmitted respectively through two lines on the chip on film.

Based on the liquid crystal display device, compensation circuit and TFT voltage shutdown method thereof according to the present invention, through detecting the returning gate signal and a signal inputted to the gate, the returning gate signal and the signal inputted to the gate are reverse to each other. When detecting the coupling resulting in a waveform with oscillation, a reverse waveform (i.e., compensation waveform) in putted to the gate through the compensation circuit to eliminate the factor coupling to the gate.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

For description of the technical means and result of the present invention, the following refers to the drawings and embodiments for detailed description, wherein the same number indicates the same part. The commonly known technique and/or structure will not be described in order to avoid unnecessary confusion.

In general, the shutdown voltage VGL of the driver circuit of liquid crystal display device to shutdown the TFT is outputted from the DC/DC conversion circuit of the PCBA and enters the gate driver through source, chip on film (COF) and wire-on-array (WOA), i.e., the gate of TFT. The shutdown voltage VGL for turning off the TFT of the liquid crystal display device is a stable DC voltage maintained at below the TFT shutdown voltage designed by the cell.

However, because the cell WOA has a longer path, the signal driving capability decreases as the WOA resistance increases. At this point, the shutdown voltage VGL will fluctuate because of the coupling effect of the data line and the VCOM signal. Once the shutdown voltage VGL coupling is too high, the TFT will be unable to completely shut down because the shutdown VGL is insufficiently low. As a result, the pixel will erroneously charge, leading to abnormal display.

Figure 1:
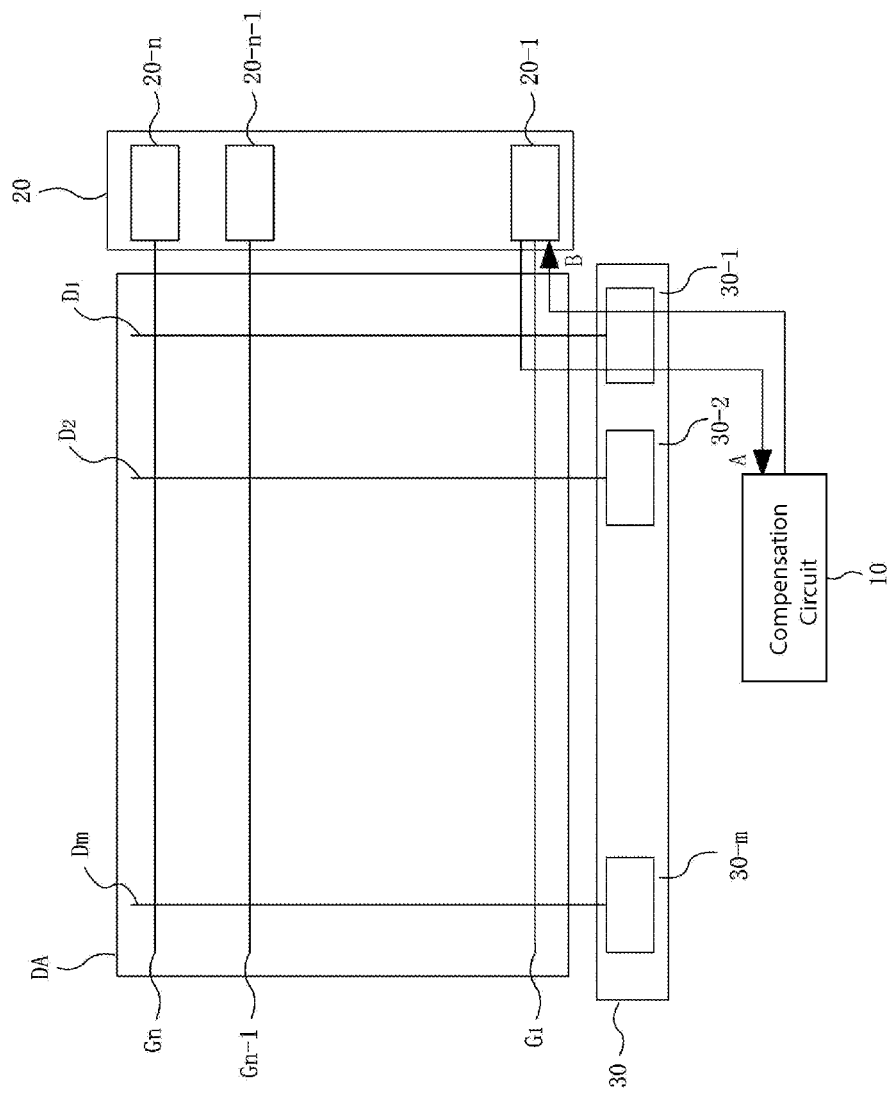
FIG. 1 is a schematic view showing the structure of a liquid crystal display device according to an exemplary embodiment of the present invention.

The compensation circuit of the present invention can be used to eliminate the effect of the coupling. FIG. 1 is a schematic view showing the structure of a liquid crystal display device according to an exemplary embodiment of the present invention. The liquid crystal display device has the capability to eliminate the effect of the coupling.

As shown in FIG. 1, the liquid crystal display device of the present invention comprises: a display area DA, a compensation circuit 10, a gate driver 20 and a data driver 30.

The display area DA comprises a plurality of gate lines G1-Gn and a plurality of data lines D1-Dm, disposed perpendicularly to each other.

The gate driver 20 comprises a plurality of stages 20-1, ..., 20-n, connected in cascade manner. Each of the plurality of stages 20-1, ..., 20-n, is connected to a corresponding gate line respectively for driving the gate line. The gate driver 20 comprises a receiving terminal to shutdown TFT.

The data driver 30 comprises a plurality of data stages 30-1, ..., 30-m, connected in cascade manner. Each of the plurality of data stages 30-1, ..., 30-m, is connected to a corresponding data line respectively for driving the data line.

The compensation circuit comprises: a shutdown voltage receiving terminal, for receiving a shutdown voltage from the DC/DC converter; a feedback voltage receiving terminal, connected to the receiving terminal of the gate driver 20 for receiving a feedback voltage from the gate driver 20; an output terminal, connected to the receiving terminal of the gate driver 20 for supplying shutdown voltage for shutting down TFT to the gate driver. The feedback voltage receiving terminal and the output terminal of the compensation circuit 20 are connected to the receiving terminal of the gate driver 20 through different path. In other words, the connection between the feedback voltage receiving terminal of the compensation circuit 10 and the receiving terminal of the gate driver 20 is different from the connection between the output terminal of the compensation circuit 10 and the receiving terminal of the gate driver 20.

When the plurality of stages 20-1, ..., 20-n of the gate driver 20 and the plurality of data stages 30-1, ..., 30-m of the data driver 30 are disposed as shown in FIG. 1, in other words, the plurality of stages 20-1, ..., 20-n of the gate driver 20 and the plurality of data stages 30-1, ..., 30-m of the data driver 30 are disposed perpendicularly to each other and the first stage 20-1 and the first data stage 30-1 are adjacent to each other as shown in FIG. 1, the receiving terminal of the gate driver 20 can be the receiving terminal of the first stage 20-1 for receiving TFT shutdown voltage, and the first data stage 30-1 is preferably passing through the connection between the feedback voltage receiving terminal of the compensation circuit 10 and the receiving terminal of the first stage 20-1 (solid line labeled as A in FIG. 1) and the connection between the output terminal of the compensation circuit 10 and the receiving terminal of the first stage 20-1 (solid line labeled as B in FIG. 1). In FIG. 1, the starting end of the solid line A and the terminating end of the solid line B are different. However, this is only for convenient display. It should be understood by those with ordinary skill in the field that the two ends are in fact the same end.

Figure 2:
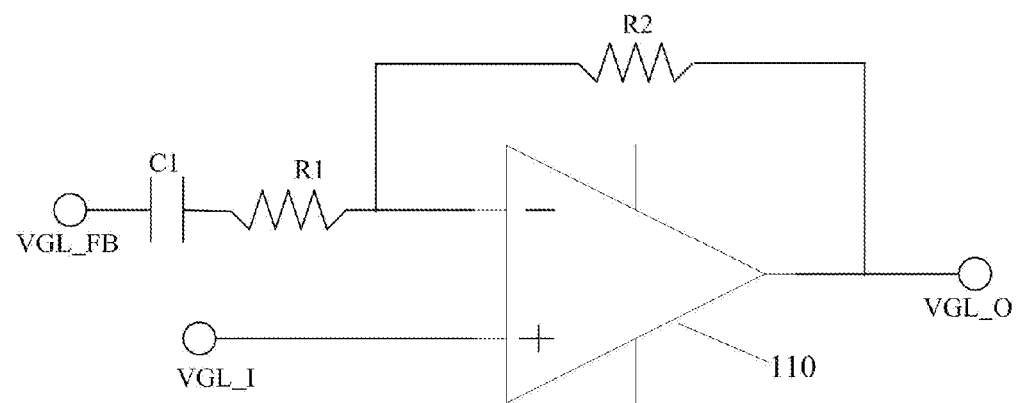
FIG. 2 is a schematic view showing the compensation circuit of a liquid crystal display device according to an exemplary embodiment of the present invention.

The following refers to FIG. 2 to describe the compensation circuit shown in FIG. 1. FIG. 2 is a schematic view showing the compensation circuit of a liquid crystal display device according to an exemplary embodiment of the present invention. As shown in FIG. 2, the compensation circuit 100 used in the liquid crystal display device comprises an operational amplifier 110.

The positive input terminal of the operational amplifier 110 is connected to the output terminal of the DC/DC converter for receiving the shutdown voltage VGL_I outputted by DC/DC converter for shutting down TFT.

The negative input terminal of the operational amplifier 110 receives, through the first capacitor C1 and the first resistor R1, shutdown voltage VGL_FB returning from display panel through COF.

In addition, the negative input terminal and the output terminal of the operational amplifier 110 are connected to the second resistor R2. In the circuit of FIG. 1, the DC portion VGL_O=VGL_I, and the AC portion VGL_O=VGL_I×R2/R1. As a result, the output voltage of the compensation circuit with the above structure can be described as:

$$VGL\_O = VGL\_I - \frac{R2}{R1} VGL\_FB$$

As seen from the above equation, the circuit achieves the effect of reverse compensation. Through selecting suitable resistance ratio between R1 and R2, a shutdown voltage VGL reverse to the coupling effect is outputted to eliminate the voltage fluctuation caused by the coupling and finally stabilize the shutdown voltage VGL to be around the middle value.

Preferably, the ratio of the resistors R1 and R2 can be determined in the circuit design phase based on experiments by taking the routing length into account.

The present invention further provides a TFT voltage shutdown method of the liquid crystal display device. The method comprises the steps of: receiving a first voltage through a first input terminal of an operational amplifier, the first voltage being supplied for a gate driver of the liquid crystal display device; receiving a second voltage through a second input terminal of the operational amplifier, the second voltage being supplied for the gate driver of the liquid crystal display device; and supplying a shutdown voltage to the gate driver through an output terminal of the operational amplifier to shutdown the TFT of the liquid crystal display device.

Through detecting the returning gate signal (VGL_FB) and a signal inputted to the gate (VGL_O), the returning gate signal and the signal inputted to the gate are reverse to each other. When detecting the coupling resulting in a waveform with oscillation, a reverse waveform (i.e., compensation waveform) in putted to the gate to eliminate the factor coupling to the gate.

IN the circuit with the aforementioned structure, because VGL_FB and VGL_O are transmitted by two paths on COF, in other words, VGL_O follows the path of VGL on COF to the gate driver and the VGL_FB is directly from the TFT gate detection, through COF of the source to return to the circuit. Hence, the signals of VGL_FB and VGL_O will not interfere with each other.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A compensation circuit for liquid crystal display device, which comprises: a first capacitor, a first resistor, a second resistor and an operational amplifier;
   wherein the first terminal of the first capacitor being connected to the receiving terminal of the gate driver of the liquid crystal display device for receiving shutdown voltage to shutdown TFT;
   the first terminal of the first resistor being connected to the second terminal of the first capacitor;
   the first terminal of the second resistor being connected to the second terminal of the first resistor and the second terminal of the second resistor being connected to the output terminal of the operational amplifier;
   the positive input terminal of the operational amplifier receiving an externally supplied shutdown voltage for the gate driver, and the negative input terminal of the operational amplifier being connected to the second terminal of the first resistor;
   wherein the connection between the first capacitor and the receiving terminal of the gate drive being independent from the connection between the output terminal of the operational amplifier and the receiving terminal of the gate driver.

2. The compensation circuit as claimed in claim 1, wherein a voltage outputted from the output terminal of the operational amplifier is supplied to the gate driver of the liquid crystal display device through a chip on film.

3. The compensation circuit as claimed in claim 1, wherein the resistance ratio between the first resistor and the second resistor is determined based on the experiment results.

4. A liquid crystal display device, which comprises:
   a display area, comprising a plurality of gate lines;
   a gate driver, comprising a plurality of stages connected respectively to the plurality of gate lines for supplying TFT shutdown voltage and an input terminal for receiving the shutdown voltage;
   a compensation circuit, further comprising: a first capacitor, a first resistor, a second resistor and an operational amplifier;
   wherein the first terminal of the first capacitor being connected to the receiving terminal of the gate driver of the liquid crystal display device for receiving shutdown voltage to shutdown TFT; the first terminal of the first resistor being connected to the second terminal of the first capacitor; the first terminal of the second resistor being connected to the second terminal of the first resistor and the second terminal of the second resistor being connected to the output terminal of the operational amplifier;
   the positive input terminal of the operational amplifier receiving an externally supplied shutdown voltage for the gate driver, and the negative input terminal of the operational amplifier being connected to the second terminal of the first resistor;
   wherein the connection between the first capacitor and the receiving terminal of the gate drive being independent from the connection between the output terminal of the operational amplifier and the receiving terminal of the gate driver.

5. The liquid crystal display device as claimed in claim 4, wherein a voltage outputted from the output terminal of the operational amplifier is supplied to the gate driver of the liquid crystal display device through a chip on film.

6. The liquid crystal display device as claimed in claim 4, wherein the resistance ratio between the first resistor and the second resistor is determined based on the experiment results.

7. The liquid crystal display device as claimed in claim 4, wherein the liquid crystal display device further comprises: a data driver, further comprising a plurality of data stages;
   wherein the display area further comprises a plurality of data lines perpendicular to the plurality of the gate lines, wherein the plurality of the data stages are connected to the plurality of the data lines respectively.

8. The liquid crystal display device as claimed in claim 7, wherein when the plurality of data stages of the data driver and the plurality of stages of the gate driver are perpendicularly disposed and the first data stage of the plurality of data stages is adjacent to the first stage of the plurality of stage, the first data stage passes through the connection between the first capacitor and the receiving terminal of the gate driver and the connection between the output terminal of the operational amplifier and the receiving terminal of the gate driver.

9. A thin film transistor (TFT) voltage shutdown method of liquid crystal display device, which comprises the following steps:
   receiving a first voltage through a first input terminal of an operational amplifier, the first voltage being supplied for a gate driver of the liquid crystal display device;
   receiving a second voltage through a second input terminal of the operational amplifier, the second voltage being supplied for the gate driver of the liquid crystal display device; and
   supplying a shutdown voltage to the gate driver through an output terminal of the operational amplifier to shutdown the TFT of the liquid crystal display device;
   wherein through detecting the returning gate signal and a signal inputted to the gate, the returning gate signal and the signal inputted to the gate are reverse to each other; when detecting the coupling resulting in a waveform with oscillation, a reverse waveform in putted to the gate.

10. The shutdown method as claimed in claim 9, wherein the returning gate signal and the signal inputted to the gate are transmitted respectively through two lines on the chip on film.

* * * * *